United States Patent
Bredow et al.

(10) Patent No.: US 10,431,259 B2
(45) Date of Patent: Oct. 1, 2019

(54) SYSTEMS AND METHODS FOR REVIEWING VIDEO CONTENT

(71) Applicants: Sony Corporation, Tokyo (JP); Sony Pictures Entertainment Inc, Culver City, CA (US)

(72) Inventors: Rob Bredow, Culver City, CA (US); Rene Limberger, Los Angeles, CA (US); Sam Richards, Culver City, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 294 days.

(21) Appl. No.: 14/674,695

(22) Filed: Mar. 31, 2015

(65) Prior Publication Data

US 2015/0310896 A1    Oct. 29, 2015

Related U.S. Application Data

(60) Provisional application No. 61/983,323, filed on Apr. 23, 2014.

(51) Int. Cl.

| | |
|---|---|
| *G11B 27/34* | (2006.01) |
| *G06F 3/0484* | (2013.01) |
| *G06F 17/24* | (2006.01) |
| *G11B 27/32* | (2006.01) |
| *G06F 16/78* | (2019.01) |
| *G06F 3/0488* | (2013.01) |
| *G06F 3/0485* | (2013.01) |
| *G11B 27/031* | (2006.01) |

(52) U.S. Cl.
CPC ........... *G11B 27/34* (2013.01); *G06F 3/0484* (2013.01); *G06F 3/0485* (2013.01); *G06F 3/0488* (2013.01); *G06F 16/7867* (2019.01); *G06F 17/241* (2013.01); *G11B 27/031* (2013.01); *G11B 27/326* (2013.01)

(58) Field of Classification Search
None
See application file for complete search history.

(56) References Cited

U.S. PATENT DOCUMENTS

| | | |
|---|---|---|
| 7,823,055 B2 | 10/2010 | Sull et al. |
| 7,941,819 B2 | 5/2011 | Stark et al. |
| 7,966,638 B2 | 6/2011 | Gossweiler, III et al. |
| 8,704,849 B2 * | 4/2014 | Kagaya ................ G06F 3/0231 345/581 |

(Continued)

OTHER PUBLICATIONS

Bruna C.R. Cunha, Video annotation and navigation on mobile devices, iOS Itview Remote UI, Oct. 15, 2012, 10 pages.

*Primary Examiner* — Gelek W Topgyal
(74) *Attorney, Agent, or Firm* — Mayer & Williams, PC

(57) ABSTRACT

Systems and methods provide techniques for reviewing content, such as reviewing video on a mobile device. A computing device with a touch screen interface, e.g., a tablet computer, executes a reviewing tool, e.g., a computer program, that causes the device to display video content and information about the video content. The tool provides an interface for selecting video, images, and information, for review and for annotation. The tool uses remote and/or local data to display video, images, and information for review.

31 Claims, 13 Drawing Sheets

(56) References Cited

U.S. PATENT DOCUMENTS

| | | | |
|---|---|---|---|
| 9,123,385 B2* | 9/2015 | Isozu | G06F 3/0482 |
| 10,055,088 B1* | 8/2018 | Boggan | G06F 3/04817 |
| 2004/0068423 A1* | 4/2004 | Shaw | G06F 19/321 |
| | | | 705/3 |
| 2005/0010955 A1* | 1/2005 | Elia | G06F 3/0482 |
| | | | 725/88 |
| 2005/0165840 A1* | 7/2005 | Pratt | G06F 17/30017 |
| 2008/0063357 A1* | 3/2008 | Kunieda | G11B 27/034 |
| | | | 386/278 |
| 2012/0093476 A1* | 4/2012 | Mountain | H04N 21/4312 |
| | | | 386/230 |
| 2012/0141088 A1* | 6/2012 | Isozu | G11B 27/005 |
| | | | 386/230 |
| 2013/0182084 A1* | 7/2013 | Tsukagoshi | H04N 13/0454 |
| | | | 348/51 |
| 2014/0072283 A1* | 3/2014 | Cho | G11B 20/10 |
| | | | 386/282 |

* cited by examiner

SYSTEMS AND METHODS FOR REVIEWING VIDEO CONTENT

CROSS-REFERENCE TO RELATED APPLICATIONS

This application claims benefit of priority of U.S. Provisional Patent Application Ser. No. 61/983,323, filed Apr. 23, 2014, entitled "Interface for Reviewing Content", assigned to the assignee of the present application and herein incorporated by reference in its entirety.

FIELD

The invention relates to the field of user interfaces, and in particular for user interfaces useful in reviewing video content.

BACKGROUND

Large-scale movie production has been a collaborative effort for many decades. However, recently, such collaborations have extended around the world as skills and resources have proliferated to many different locations. While fruitful in many ways, such collaborations have made it more difficult for the production team to meet to view and discuss content, e.g., shot footage.

Digital communications have certainly kept pace with, or outpaced, developments in movie production and technology, and have allowed and enabled communications across far-flung teams in every discipline. However, reviewing artistic efforts such as shot footage requires close attention to detail and the ability to focus on fine aspects of a shot.

Current technologies are deficient in enabling such collaborations. For example, the use of a laser pointer in pointing out details to be discussed allows collaborators in one room to see what a speaker is focusing on, but the same leaves no lasting record and collaborators not in the room are unable to view that which is intended.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles meet the needs of the above in several ways. For example, systems and methods according to present principles provide techniques for reviewing content, such as reviewing video on a mobile device. In one implementation, a computing device with a touch screen interface, e.g., a tablet computer, executes a reviewing tool, e.g., a computer program, that causes the device to display video content and information about the video content. The tool provides an interface for selecting video, images, and information, for review and for annotation. The tool uses remote and/or local data to display video, images, and information for review.

In one implementation, the tool provides an interface to select content for review from local and/or remote storage, such as for selecting files, playlists, or active editing sessions. In yet another implementation, multiple images may be displayed from or related to a video sequence, e.g., a movie or television show. In yet a further implementation, systems and methods provide for displaying a video sequence, e.g., playing a video clip, and controlling the display of the sequence, e.g., start, stop, pause, scrubbing, other trick play, and the like. In yet another implementation, the systems and methods provide for the display of images from a playlist of video clips as well as images and clips related to an item selected from the playlist, e.g., in row(s) and/or column(s), loops, stacks, grids, and the like. In yet another implementation, systems and methods according to present principles provide an interface to select an image or video clip from the displayed images. In yet another implementation, an interface may be provided to display, select, filter, and search for multiple versions of an image or video clip. In yet another implementation, an interface may be provided to display, select, filter, and search for information related to one or more images or video clips, e.g., history information, author information, notes, or the like.

In yet another implementation, systems and methods according to present principles may provide editing tools to adjust a selected image or video, e.g., the adjustment related to exposure, color, brightness, cropping, or the like. The editing tools may further apply to playlists, e.g., providing features such as copying, adding, deleting, changing order, or building new playlists, or the like. Editing may be implemented by, once an edit is agreed to by the participants, causing the edit to enter the film production pipeline.

In other implementations, systems and methods provide annotation tools to add notes or marks to an image, e.g., text, drawing, highlighting, links, or the like. In a related implementation, systems and methods provide an interface for connected user interface devices, such as input devices, e.g., pens, computer mouses, or the like, as well as display devices, e.g., displays and projectors.

In another implementation, the tool provides a way to facilitate (and to join) a collaborative review session with other reviewing devices, e.g., showing images and information simultaneously on multiple devices interacting through a network. In further such implementations, systems and methods provide collaboration tools for users to review content together, such as displaying one or more user controlled pointers or messages for sharing audio, e.g., conversation, on multiple devices, in real time or asynchronously, e.g., the latter using recording of user input.

In one aspect, the invention is directed towards a method for reviewing content, including: receiving data entered by a user about a first plurality of scenes for review; on a user interface of a first computing device, displaying indicators of the first plurality of scenes for review; highlighting one of the first plurality, the highlighted indicator corresponding to an indicator of a current scene for review; by analyzing data corresponding to the first plurality, determining indicators of a second plurality of scenes for review; and displaying the determined indicators of the second plurality of scenes, the second plurality of scenes constituting context scenes associated with the current scene for review.

Implementations of the invention may include one or more of the following. The indicators of the first plurality may be disposed along a first straight axis, e.g., where the first straight axis is a vertical axis. They may also be displayed via a carousel interface. The indicators of the second plurality may be disposed along a second straight axis, e.g., which may be horizontal. The indicators of the second plurality may also be displayed using a carousel interface. The indicators of the first and second plurality may be thumbnails. An indicator of the first context scene may be disposed to a left of an indicator of the current scene, and an indicator of a second context scene may be disposed to a right of the indicator of the current scene, where the first context scene is a scene occurring in time directly before the current scene, and the second context scene is a scene occurring in time directly following the current scene. The method may further include creating a user interface element of a separate frame or window and displaying a playback of the current scene in the created separate frame or window. The method may further include creating an enlarged frame or window at an intersection of the vertical axis and the horizontal axis, and displaying a playback of the current scene in the created enlarged frame or window at the intersection of the vertical axis and the horizontal axis. The method may further include, upon activation of the separate frame or window, or the frame or window at the intersection, transmitting a signal to transform the user interface such that the current scene is caused to play back in a full-screen view. Upon the transforming, the method may further include displaying a user interface for a tool to operate on the current scene.

The tool may be a tool for annotation of the current scene, a tool for adjustment of the current scene, a shuttle tool, a filter tool, a playlist tool, or a combination of the above tools. The tool for annotation may include a tool such as a laser pointer tool or a mark-on tool. The tool for adjustment may enable adjustment of a scene aspect selected from the group consisting of: exposure, brightness, cropping, color, and combinations of the above. The playlist tool for adjustment may enable functions selected from the group consisting of: copying, adding, deleting, changing order, building new playlists, and combinations of the above. The tool may appear on the right or left side of the user interface when the user interface is in a landscape orientation.

The method may further include, upon activation of a scene in the first or second plurality, displaying a third plurality of scenes, the third plurality of scenes corresponding to historical versions of the activated scene. The method may further include displaying a window with metadata for each of the third plurality of scenes. The historical versions of the activated scene may correspond to different takes of the scene. The first and second plurality of scenes may be sourced from a server.

The method may further include: displaying data representing the first and second plurality of scenes on a user interface of a second computing device; receiving data corresponding to a first annotation associated with the current scene from the first computing device; receiving data corresponding to a second annotation associated with the current scene from the second computing device; and and storing data corresponding to the first and second annotations associated with the current scene on the server. The first annotation may be received when the first computing device has control of an editing session, and the method may further include disallowing receiving a second annotation from the second computing device when the first computing device has the control of the editing session. The method may further include receiving audio from the first or the second computing device, and sharing the audio with the second or the first computing device, respectively, e.g., in real time.

The first plurality of scenes may correspond to medical images of a patient corresponding to a diagnosis, and in this case the second plurality of scenes may correspond to other medical images of the patient. In another implementation, the first plurality of scenes may correspond to different shots within a movie or television episode, and the second plurality of scenes may correspond to, for a selected one of the first plurality, scenes occurring before and after the selected one of the first plurality. For example, the first plurality of scenes may correspond to different takes of a scene.

In another aspect, the invention may be directed to a method for reviewing content, including: displaying multiple playlist images; selecting a playlist image from the multiple playlist images; and displaying multiple context images related to the selected playlist image, where at least one of the context images is an image that comes before or after the selected playlist image in a video sequence of images; where: the multiple playlist images are displayed as a sequence of images in a vertical column, the multiple context images are displayed as a sequence of images in a horizontal row, and the vertical column and horizontal row intersect at the selected playlist image.

Implementations of the invention may include one or more of the following. A determination of context images may be performed by analyzing time stamp data to determine which images come before and after the selected playlist image. Each playlist image may be an image in a respective video clip including multiple images, and each context image may be an image in a respective video clip including multiple images. The method may further include receiving a selection of a context image from the multiple context images. The method may further include displaying multiple versions of the selected playlist image; and displaying data corresponding to history information for each of the displayed multiple versions of the selected playlist image.

In another aspect, the invention is directed towards a device for editing video, including: a user interface module configured to display multiple scenes for review, to receive a selection of a scene from the multiple scenes for review, and to display multiple context scenes related to the selected scene, at least one of the context scenes being a scene that comes before or after the selected playlist scene in a video sequence of scenes; and a tools module configured to provide user modification of the selected scene, and to calculate a response of the selected scene to the user modification, where the response of the selected scene is transmitted to the user interface module for display on the device.

Implementations of the invention may include one or more of the following. The device may further include a communications module configured to receive files corresponding to the multiple scenes and the multiple context scenes. The communications module may be further configured to share data about one or more of the multiple scenes with other devices. The shared data may correspond to the multiple scenes and the multiple context scenes as well as annotations, adjustments, or user audio or video comments. The device may further include a control module, the control module configured to allow only one device at a time to exert control over the reviewing session, where the exertion of control constitutes the ability to annotate, adjust, or change a selected image. The tools module may be configured to annotate or adjust the selected scene. The device may further include a history module configured to, upon activation of the selected scene, display indications of one or more versions of the selected scene.

Advantages of the invention may include, in certain embodiments, one or more of the following. Viewers are presented when channel surfing with the most popular channels or with channels most likely to have content of interest. By starting with popular channels, the viewer is more likely to quickly reach programming they desire to watch, thus missing less of such programming. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 8 is another diagram showing another illustrative user interface which may be employed by a reviewing device according to present principles, showing in particular how different playlists may be employed and navigated to.

Like reference numerals refer to like elements throughout. Elements are not to scale unless otherwise noted.

DETAILED DESCRIPTION

Figure 1:
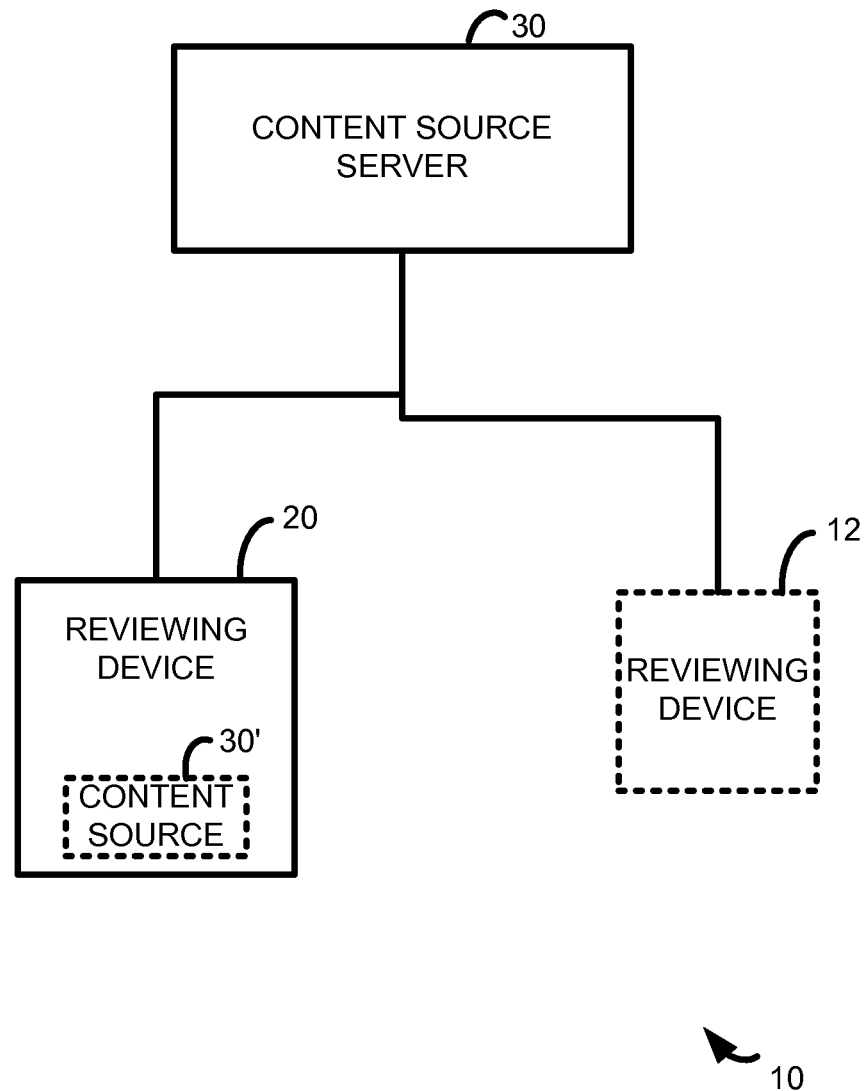
FIG. 1 illustrates a schematic diagram of a system for reviewing content according to present principles.

Referring to FIG. 1, present principles generally relate to a system 10 which may be embodied by a reviewing device 20 in signal communication with a content source server 30 (the content may also be provided by an internal content source 30'). In some implementations, the reviewing device 20 is a first reviewing device in signal communication with a second reviewing device 12. As with the first reviewing device, the second reviewing device 12 may receive content from the content source server 30, from the content source 30', or from its own internal content source. Generally, a user interface of the reviewing device 20 is synchronized with a user interface of the reviewing device 12, so that the same are reviewing the same content. Annotating via an annotation tool and module is described below, and annotations may be entered by either the user of the reviewing device 20 or the user of the reviewing device 12, depending in some implementations on which has control (see below). Edits and annotations may be synchronized so that both reviewing devices see the edits and annotations made in real time, or asynchronous such that edits and annotations are made on one reviewing device and presented to the other at a later time. Extensions to collaborative sessions with more than two reviewing devices will also be understood.

The description below is generally in the context of a tablet application, e.g., for an Android® or iOS® device, but it will be understood systems and methods according to present principles may be performed by other devices, including mobile devices such as smart phones, laptop computers, desktop computers, and the like. In an implementation such as a tablet application, the reviewing application is generally installed and instantiated or launched for use.

If the use is only for a single user reviewing local video content, the user may proceed directly to use of the application. However, especially if the application is reviewing content stored elsewhere, and/or if the device is participating in a collaborative session across two or more reviewing devices, a login may be required. Consequently, the user may be presented with a login screen (not shown in the figures). For example, the login screen may be revealed by programmatically sliding a main window in a particular direction, e.g., to the right, and login details may be revealed underneath from the left. The login screen generally provides a secure login with prompts for username and password. Login credentials may be stored in a secure, native keychain. The password stored in the keychain may be configured to expire after a predetermined time of device inactivity. The login screen may also offer a UI element shortcut to the application settings, e.g., via a gear symbol. Upon selection of the gear symbol, a settings dialog may be displayed, e.g., as a modal window.

Figure 2:
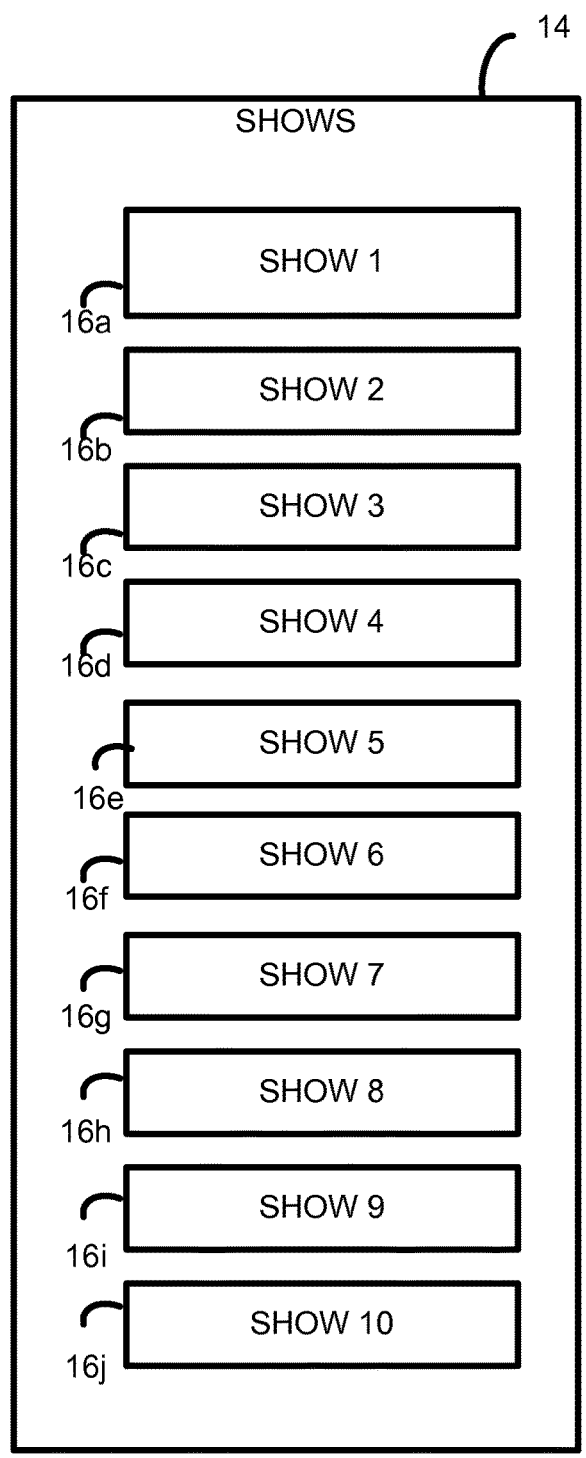
FIG. 2 is a diagram showing an illustrative user interface which may be employed by a reviewing device according to present principles.

After the user has logged in, a navigation controller may be presented in place of the login screen. For example, referring to FIG. 2, the top level of the navigation hierarchy may be a UI element 40 including a list of projects 14, referred to in the figure as shows 16a-16j. This list may be dynamically refreshed periodically. The shows 16a-16j provide a list of different projects the user account may be associated with, and filtering or searching functionality may be provided to refine the list in certain implementations. The shows 16a-16j may be generally those to which the user has access through their user account or via other sorts of permissions.

Figure 3:
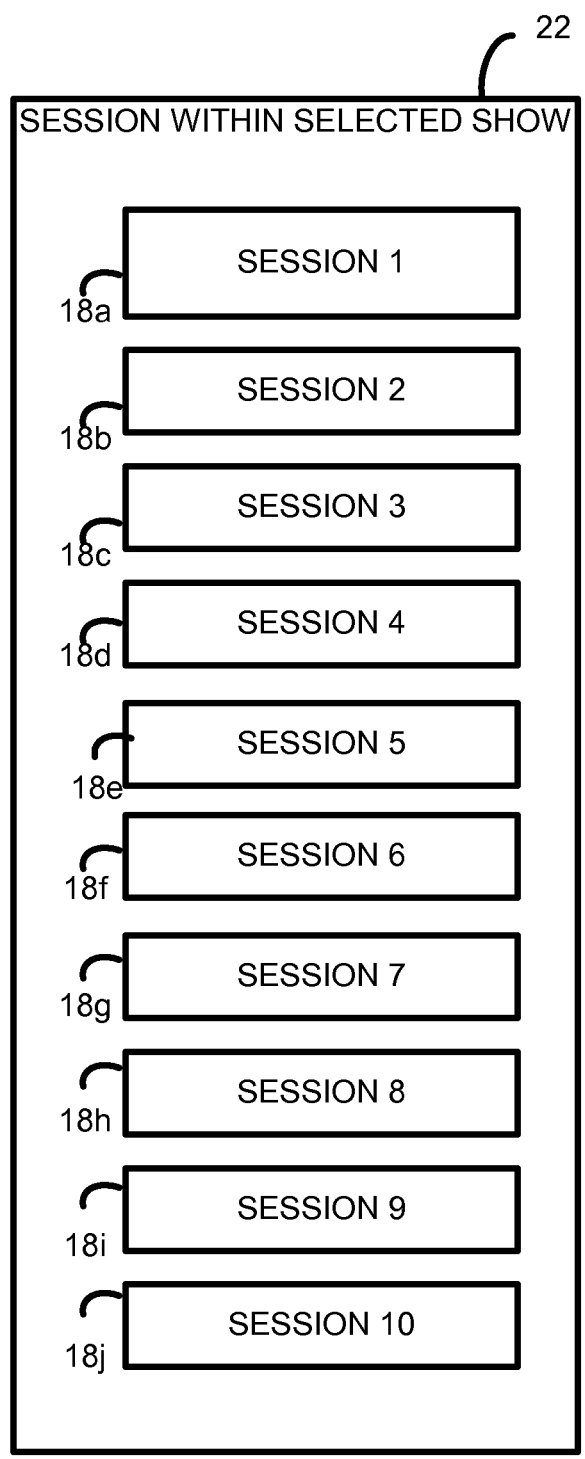
FIG. 3 is another diagram showing another illustrative user interface which may be employed by a reviewing device according to present principles.

After the user has selected a show via activation of an appropriate UI element (and, e.g., transmission of a data signal from the reviewing device to the content source server 30), the content source server 30 (or internal content source 30') may transmit a list of reviewable sessions as shown by the UI element 50 of FIG. 3, and more particularly a list 22 of sessions 18a-18j within the selected show (one of 16a-16j). The sessions 18a-18j indicate sessions currently active and associated with the show. Selecting a session will join the user, and more particularly the reviewing device 12, to the session. Once selected, the joint session may be marked by an indicator within the selected session row, thus indicating to others which session is currently undergoing review.

After the session is joined, a main window may slide into place, e.g., in a full-screen mode for the collaborative review. To reveal a list of sessions again, a user can slide the session list window back in with an appropriate swiping motion. With such motions, the user may be enabled to navigate to sessions, shows, settings, and the login screen.

Figure 4:
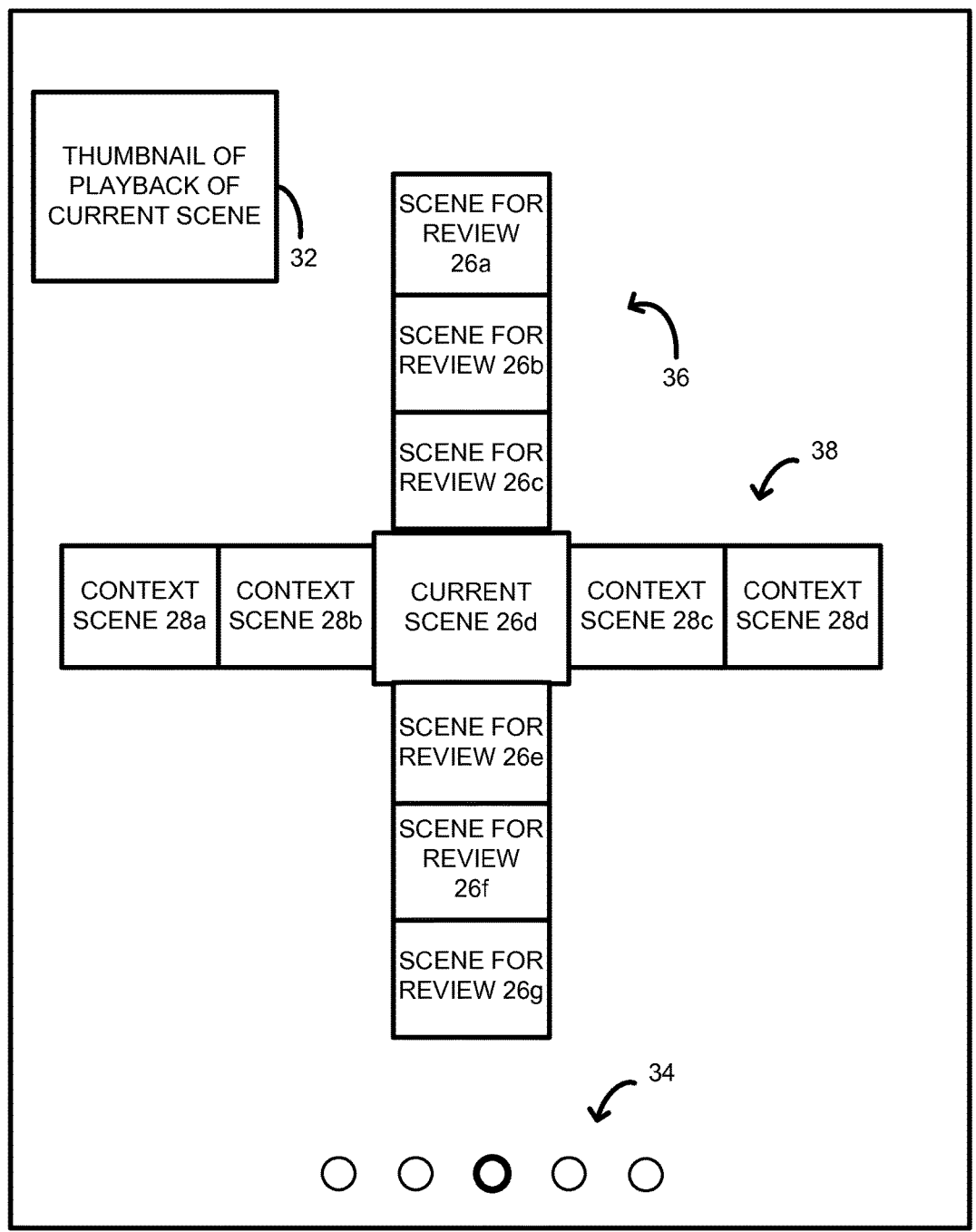
FIG. 4 is another diagram showing another illustrative user interface which may be employed by a reviewing device according to present principles, showing in particular a T-bar interface.

FIG. 4 depicts an exemplary implementation of a main user interface or window 60. The main user interface 60 represents a center of user interaction with all media in the session. A set of multiple images is disposed in a vertical fashion, and the same constitutes indicators of scenes for review 26a-26g. The indicators are generally in the form of thumbnails, although textual descriptors can also be employed. The scenes need not be in any particular order, but are often disposed in the order in which they will be reviewed. The thumbnail may represent a first image of the scene, but more often represents a middle image or other image that is characteristic of the scene, which can allow a user to rapidly determine which scene to review. The playlist carousel 36 may include any number of scenes.

A middle scene 26d (also termed a "current scene") may be disposed in the center of the playlist carousel images, and may be emphasized on the user interface by being larger than its surrounding images. The display 32 may include a thumbnail of the current scene 26d, representing what is currently playing and/or being reviewed and edited as the current scene.

The display 32 may also allow a user to observe a session without taking control, as described in greater detail below. By double tapping on the display 32, a detailed view may be obtained, again as described in greater detail below.

The scenes for review 26a-26g may be disposed on a playlist "carousel-type" user interface 36, so that by swiping actions, any number of scenes may be placed as the current scene, and thus placed in position for review. Thus, in use, a user may view the UI 60 and swipe the carousel 36 to find a scene to review, and once the desired scene for review is in the current scene position, e.g., 26d, a thumbnail of the scene may be played back in the display 32.

A number of indicators of context scenes 28a-28d, e.g., thumbnails, are illustrated as disposed in a horizontal fashion to the right and left of the current scene 24. The context scenes may also be disposed on a carousel 38 to allow convenient access to any number of the same. The context scenes represent the context of the current scene, e.g., defined here as scenes occurring before and after the current scene 26d, as determined by, e.g., timestamp or other metadata. Context may be provided by a certain number of shots, e.g., two in the figure, to the left and to the right of the current scene. Page control may be provided by dots 34, which detail the number of playlists in the session. By swiping the user interface 60, to the right or to the left, access may be gained to such other playlists.

The user interface 60 may be termed a "T-Bar" and may include the two carousel-like thumbnail collections arranged perpendicular to each other. In use, a reviewer scrolls through these carousels to select a current scene for review. The current scene may be disposed always in the center of the T-bar, and as noted may be highlighted by being scaled slightly larger than the other scene thumbnails in the carousels.

Generally, in some implementations, only one of the two carousels is active and in the foreground at a time. In one implementation, a foreground carousel is fully opaque, while a background carousel is dim and semi transparent. A default may set the playlist carousel in the foreground and the context carousel in the background. Scrolling or tapping the background carousel may bring it to the foreground.

Certain variations are now described. Both the playlist and context carousels may have a vertical play head (not shown) that represents the location of the current frame being viewed. This play head can be dragged with a finger for fast scrubbing through a clip or playlist. Tapping on the playlist may be employed to toggle play from the current frame. Tapping on a scene in the playlist or context carousels may start playback from the beginning of that scene.

Figure 5:
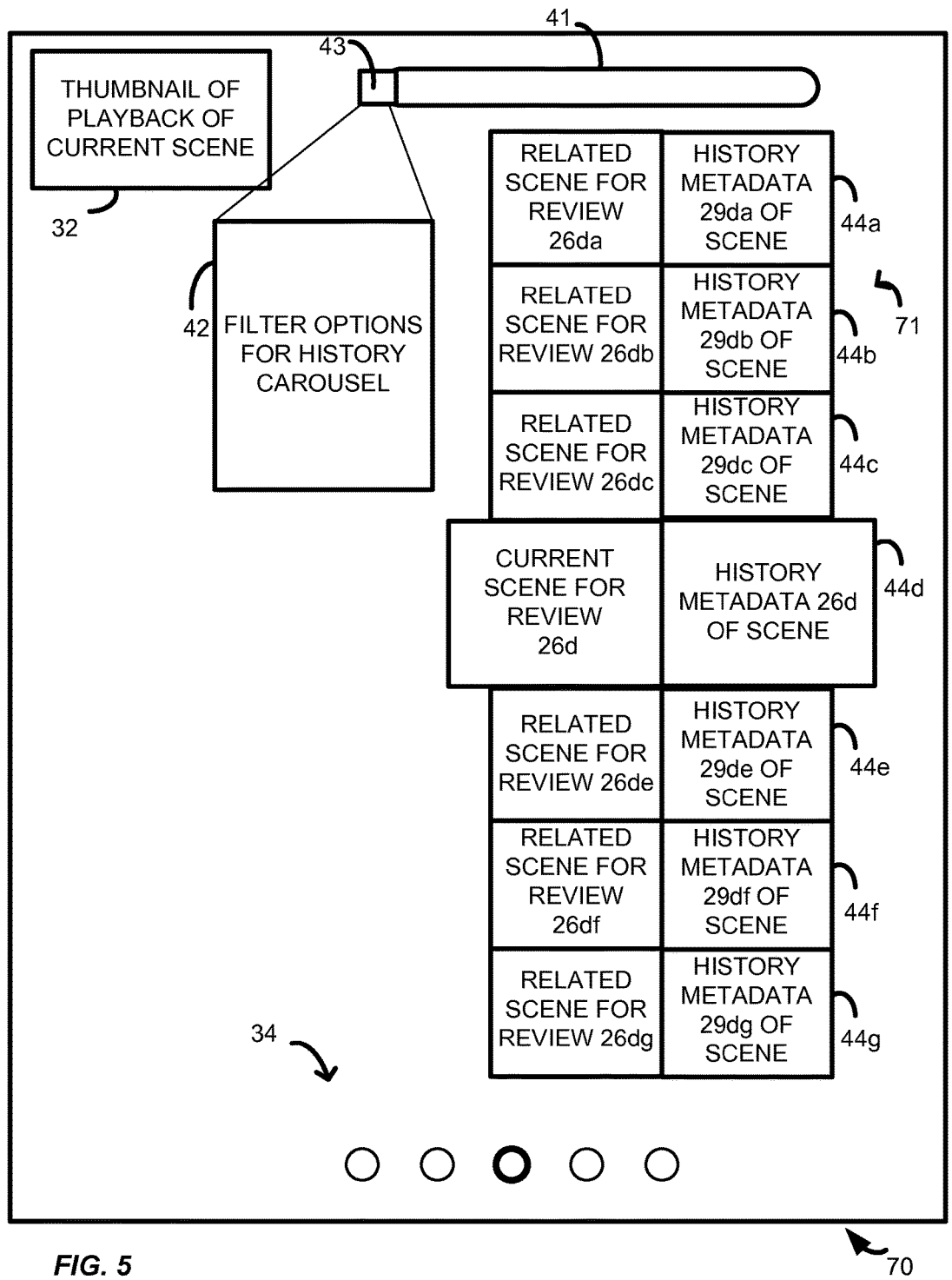
FIG. 5 is another diagram showing another illustrative user interface which may be employed by a reviewing device according to present principles, showing in particular an interface for reviewing related and/or historical versions of a scene.

Referring now to FIG. 5, a user interface 70 is illustrated displaying a history carousel 71 which allows a user to view historical or other versions of a current scene. For example, from the playlist carousel, if a scene thumbnail (or other indicator) pressed (via touch screen) for at least a predetermined period of time, e.g., a "double press", the history carousel 71 may be activated and displayed. The history carousel 71 may include a plurality of scenes 26da-26dg related to the current scene 26d, i.e., previous versions of a shot, other takes, and other versions created in the overall history of a creation of a scene. Frames or windows 44a-44-g constituting history metadata 29da-29dg may be provided, each frame adjacent the thumbnail of its corresponding scene. Such history metadata may include, e.g., a date the footage was captured or created, crewmembers who have viewed it, talent within the scene, a duration of the scene, camera and other technical details, time of recording, and the like.

A filter text field 41 may be employed to enter a filter string, which may filter the list of versions by specific metadata tags, e.g., date, time, artist, and other such data. While typically the history carousel 71 is available from the playlist carousel, in some implementations it may also be available from the context carousel.

Upon activation of an appropriate element 43 associated with the filter text field 41, a more advanced filter dialog 42 may appear, e.g., as a drop-down menu. Such a dialogue may support, e.g., per show, pre-configurable filter strings that can quickly filter the history carousel. The filter menu may also maintain a history of, e.g., the last filters used for quick access and reuse. In this way, a faster and more convenient way is provided to apply common filters, compared to manual entry, which reduces load on a main processor or multicore processor system, as well as on integrated graphics chipsets, GPUs, graphics cards, or the like.

Tapping on a scene within the history carousel 71 may cause that version of the scene to be loaded into the playlist carousel, and the view may then return to the T-Bar view noted above. In some implementation, a scene may be required to be the center scene in the history carousel, e.g., scene 26d in FIG. 5, before tapping the same causes it to be loaded as a scene in the T-Bar. As with the user interface 60 of FIG. 4, a thumbnail playback 32 may be provided of the current scene 26d.

Figure 6:
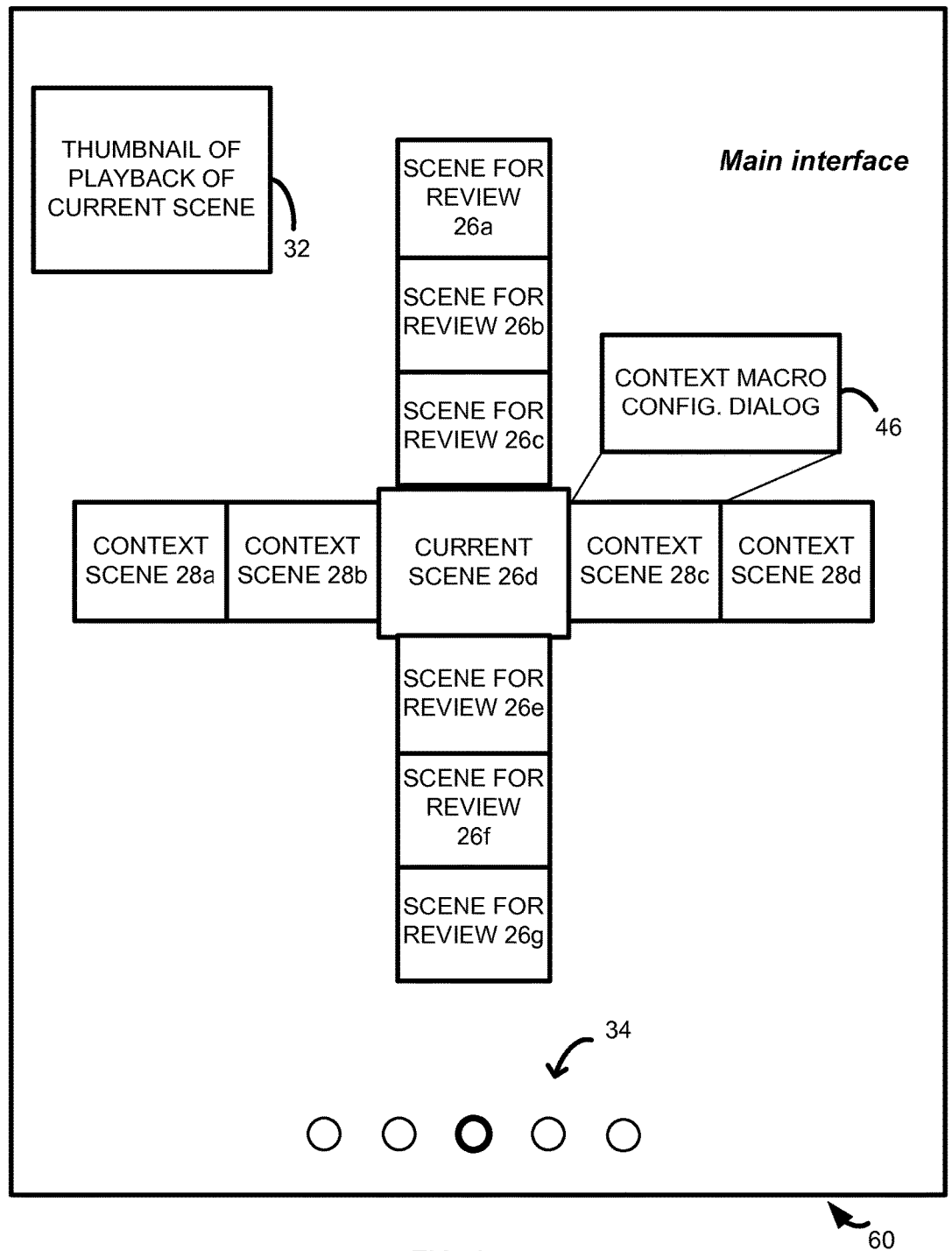
FIG. 6 is another diagram showing another illustrative user interface which may be employed by a reviewing device according to present principles, showing in particular a T-bar interface with a context macro configuration dialog.

Referring to the UI 60 illustrated in FIG. 6, in which the T-Bar UI is again shown, a context macro configuration dialog window 48 is displayed as associated with a particular context scene, in this case context scene 28c. A context macro configuration dialog window 48 is generally available for each of the different context scenes. The dialog allows the user to configure the rules that build the context scenes 28a-28d, e.g., the number of shots before and after the playlist clip (current scene) 26d, to be included in the context carousel. That is, while four context scenes are shown in the UI 60, two occurring before the playlist clip and two occurring subsequent to the same, more or less may be provided according to settings in the context macro configuration dialog window 48. Other exemplary configurable settings include whether the context scene should be viewed in 2D/3D (where such options are available), the size of the thumbnail, and so on.

Figure 7:
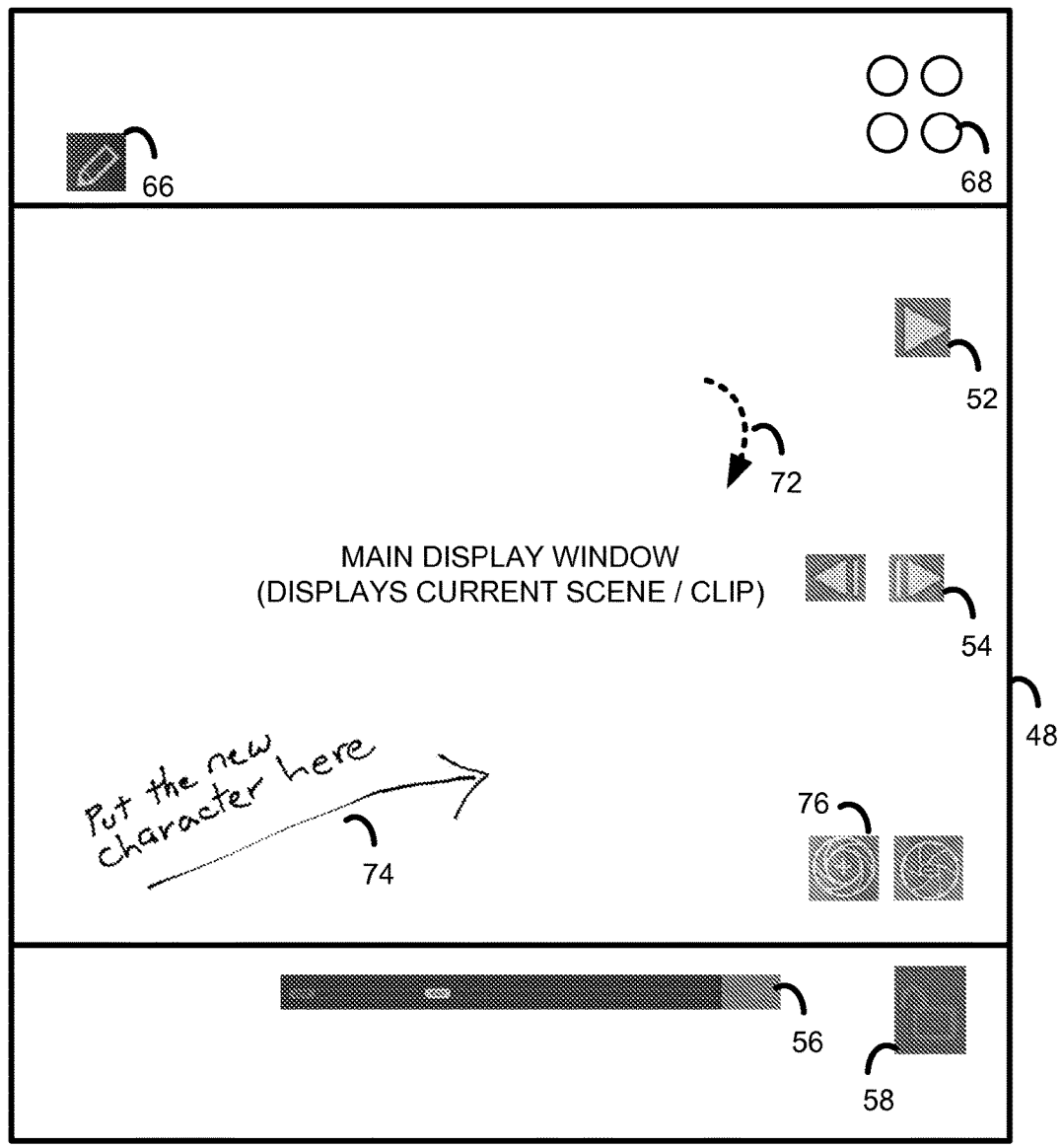
FIG. 7 is another diagram showing another illustrative user interface which may be employed by a reviewing device according to present principles, showing in particular a detail view of a scene.

FIG. 7 illustrates an exemplary UI 80 of a detail view, which is a view that shows the current scene full-screen. To transition to and from the detail view, various UI elements may be employed on the UIs 60 and 70. However, in a tablet computer implementation, the detail view may be conveniently accessed by a two finger pinch gesture. For example, to open the detail view UI 80 from the T-bar, the center item may be pinched open or double tapped, and the same may be performed on the display 32 as well as on the scene in the center of the T-bar. To exit the detail view UI 80, a pinch close gesture may be employed.

In the detail view UI 80, a main display window 48 may be provided in a central location, in which the current scene is played back. Various control elements may be provided, and are described below.

For example, a scene timeline 56 may appear below the scene. The scene timeline 56 allows a user to interact with the scene by scrubbing the play head within the time line. A user may also tap anywhere within the time line to set the current frame. In some implementations, the current frame can be scrubbed using a two-finger left or right scroll gesture within the main display window 48. Other controls may also be enabled, e.g., to toggle play, a one-finger tap gesture may be configured.

Menu components may be provided on the left and right sides of the main display window 48, and the components provided may depend in part on the orientation of the device. In many cases, landscape orientation may provide a larger view of the main display window; in other cases, portrait orientation may provide a greater access to or greater number of menu items. As seen in FIG. 7, the menu bar items may be sized and positioned such that some gestures may activate the items.

When the menu items are tapped, a corresponding context menu may be displayed on the UI 80. For the UI 80, the context menu is often to provide tools useful for review and editing. In this context, the term "editing" may generally refer to reviewing and marking up an asset file, without changing the underlying asset file itself. The changes to the underlying asset file may generally be provided subsequent to the review session, as part of the production pipeline. However, for certain changes on files, the edits may be applied to the underlying asset, e.g., certain small changes in exposure, brightness or contrast.

As one example of a tool provided by a context menu, an annotation tool may be provided as shown by a pen icon 66 with various provided colors (as well as an erase option) 68. Each tool may also be "locked" by a lock icon 58, which can cause the particular tool to be maintained on the display until the lock is unlocked. For example, as shown in FIG. 7, the annotation tool of a pen 66 on the left-hand side of the screen provides various options 68 on the right-hand side of the screen. This configuration of tools on the opposite side of the screen (as the corresponding tool icon) may be provided for many of the tools. In this case, the lock option, if locked, may display the tool options, e.g., color 68, on screen, regardless of the selection state of the corresponding menu item on the opposite side. With two menus on opposite sides, the detail view UI 80 can be conveniently operated with both thumbs.

Various shuttle tools may also be configured within the system, such as play/pause icon 52, to toggle play, icons 54 to step through frames in a forward or backward direction, as well as other such activatable elements, e.g., to mute or un-mute the scene audio, and the like. A set of adjustment tools may also be provided, e.g., UI elements 76, which adjust the exposure of the scene up or down by, e.g., f-stop units, which resets the f-stop back to zero, or which provides other exposure adjustments.

As noted above, a pointer mode may provide various other types of actions. For example, in a "laser pointer mode", one finger dragging across the main display window 48 may cause a laser pointer hotspot and trail 72 to be drawn on screen and on any other remote client, e.g., other reviewing devices. Such a laser pointer mode can be useful to point out specific areas of the image.

An annotation mode may be entered by activating an annotation button or other such activatable element within the menu of the main display window 48. One such activatable element is annotation mode icon 66. When the annotation mode is active, one finger dragging will act as a drawing pen, allowing persistent annotations on the image. An annotation 74 is illustrated within the main display window 48 to indicate how such might appear in practice.

The above have noted various options available using one finger dragging. It will be understood that a stylus may perform similar functions. Additionally, external input devices may be employed, e.g., as may be connected via an RF transmission scheme such as Bluetooth®. In some cases, if a Bluetooth device such as a stylus is connected, an implicit draw mode is enabled. If the user then draws with the tip of the pen, the annotation function is automatically enabled, allowing annotation of the media without requiring selection of the annotation tool from the menu. In this use case, one finger dragging may be employed in combination to provide a dedicated laser pointer functionality. While Bluetooth® is described here, it will be understood that any such wireless (or wired) connection may be employed, by using a wireless circuit within the computing device to connect to a physical stylus, the overall system may be made more efficient as the user input can be made more exact, reducing the number of overall annotations (and thus computational steps by a computing environment) required to reach a desired end result. Such advantages allow the computing environment to run more efficiently and to inure other benefits and advantages as will be understood from this disclosure.

To exit detail view, a pinch out gesture may be employed to return to the T-Bar UI. The detail view media may then scale down to the size of the T-Bar center thumbnail.

Figure 8:
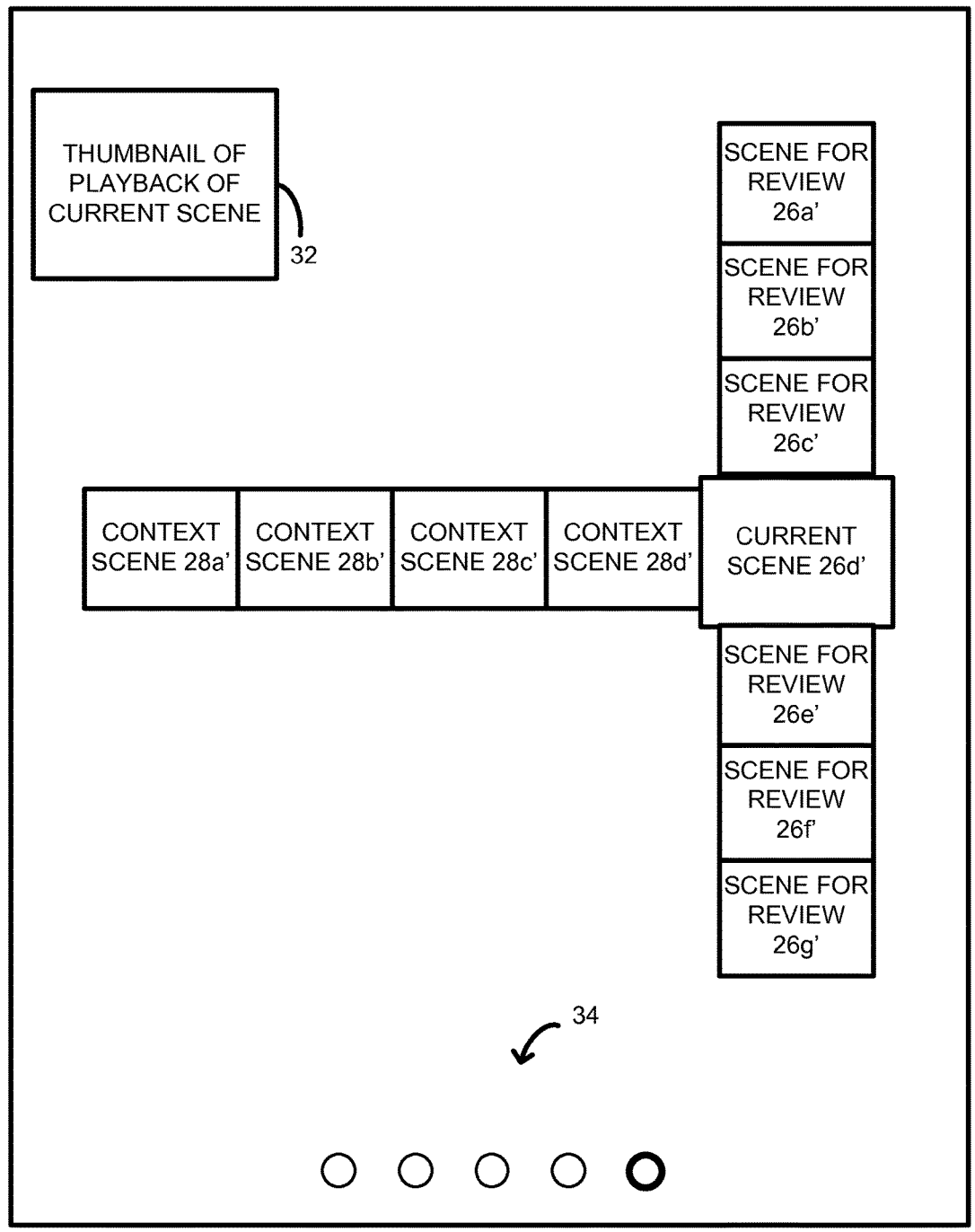
Figure 9:
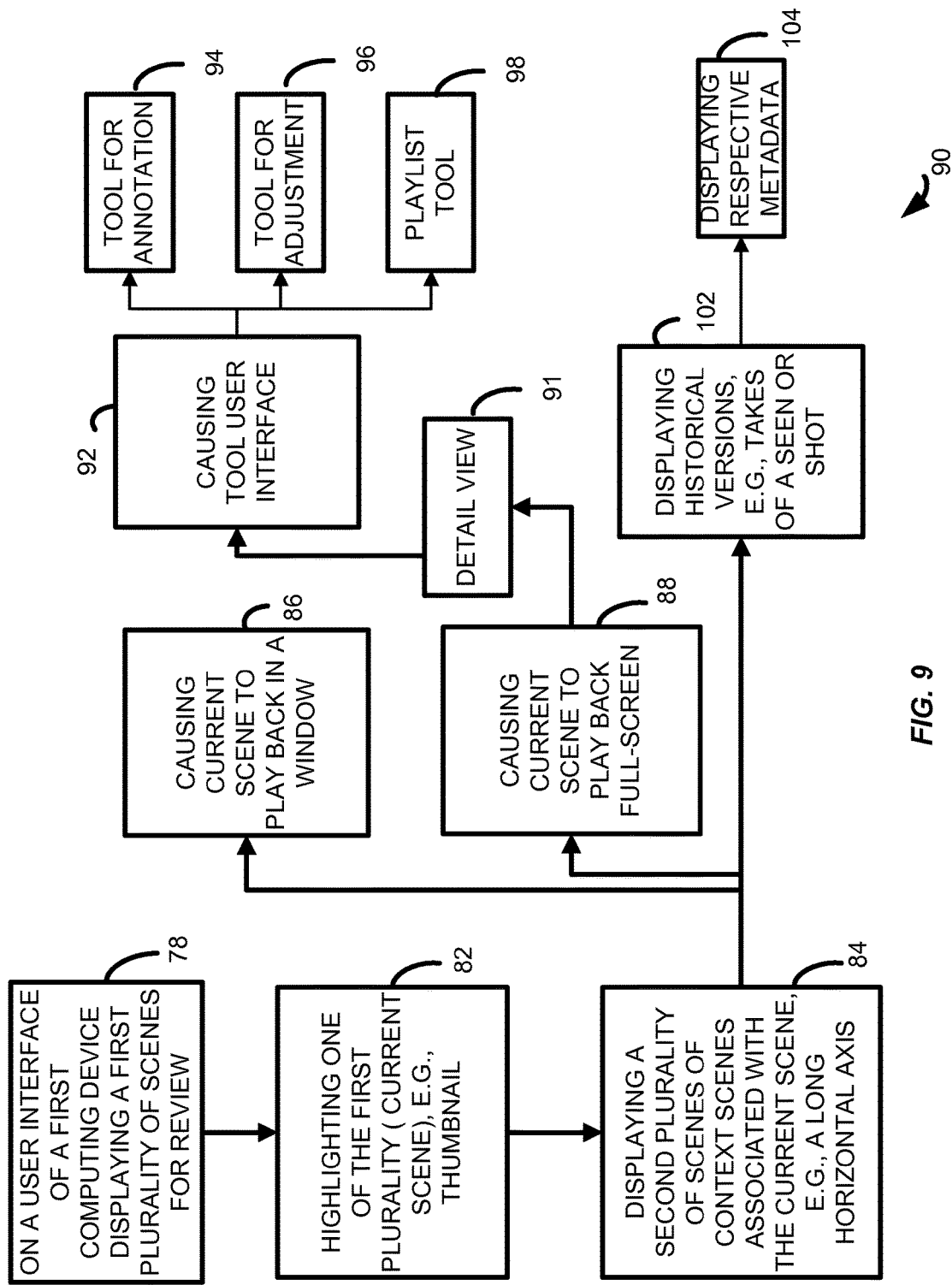
FIG. 9 is a flowchart illustrating a first method according to present principles.

Referring now to the T-Bar UI 60 of FIG. 8, another functionality of this view is the ability to view additional playlists within the same session, since the session may host more than one playlist. In this case, the T-Bar will show a page control at the center bottom screen edge with a number of dots 34 corresponding to the number of playlists in the session. The current selected playlist may be highlighted, while the others may be dimmed and/or semi transparent. For example, in FIG. 8, the rightmost dot is highlighted. To cycle through the playlists in the current session, a one-finger swipe to the left or to the right in an area outside of the T-Bar may be employed. The scenes for review and the context scenes within FIG. 8 are shown with primed components to indicate that the same are generally different scenes than are displayed in FIG. 4. As the vertical portion of the UI has slid to the right, there may be fewer context scenes visible when other playlists are viewed. Alternatively, a one or two finger swipe may drag the desired playlist, e.g., the rightmost playlist represented by the highlighted dot in FIG. 8, to the center.

FIGS. 9-12 illustrate a number of flowcharts that describe exemplary methods implementable within the context of present systems and methods. For example, referring to the flowchart 90 of FIG. 9, a first step may be, on a user interface of a first computing device, to display a first plurality of scenes for review (step 78). One of the first plurality may then be highlighted (step 82). That which is highlighted generally represents a current scene, and may further be represented in icon form by a thumbnail as part of the UI.

A next step is to display a second plurality of scenes which are context scenes associated with the current scene (step 84). The context scenes generally represent scenes occurring before and after the current scene. In one implementation, the first plurality is displayed along a vertical axis, and the second plurality is displayed along a horizontal axis.

After this initial "T-bar" interface of thumbnail images is displayed, various other steps may occur. For example, the current scene may be caused to play back in a window (step 86). Alternatively, the current scene may be caused the playback full-screen (step 88), e.g., in a "detail" view. Where the current scene is caused to play back full-screen, a detailed view UI may be instantiated (step 91), followed by the display of one or more tools in a user interface (step 92). The tools may be of various forms, including an annotation tool (step 94), in which various markups may be made, an adjustment tool (step 96), in which aspects such as exposure, brightness, or contrast may be adjusted, or a playlist tool (step 98), in which various tasks may be performed with respect to the one or more playlists. For example, scenes may be added from or removed from a selected playlist, playlists may be reordered, or the like.

Besides playing back the current scene, another alternative from the T-bar view is to display historical versions of the scenes (step 102). For example, a user may perform an action with respect to a current scene that causes the user interface to shift to a historical view, in which case the current scene is shown along with other versions of the current scene, e.g., different shots, different takes, and the like. Metadata corresponding to each historical version may also be illustrated (step 104).

Figure 10:
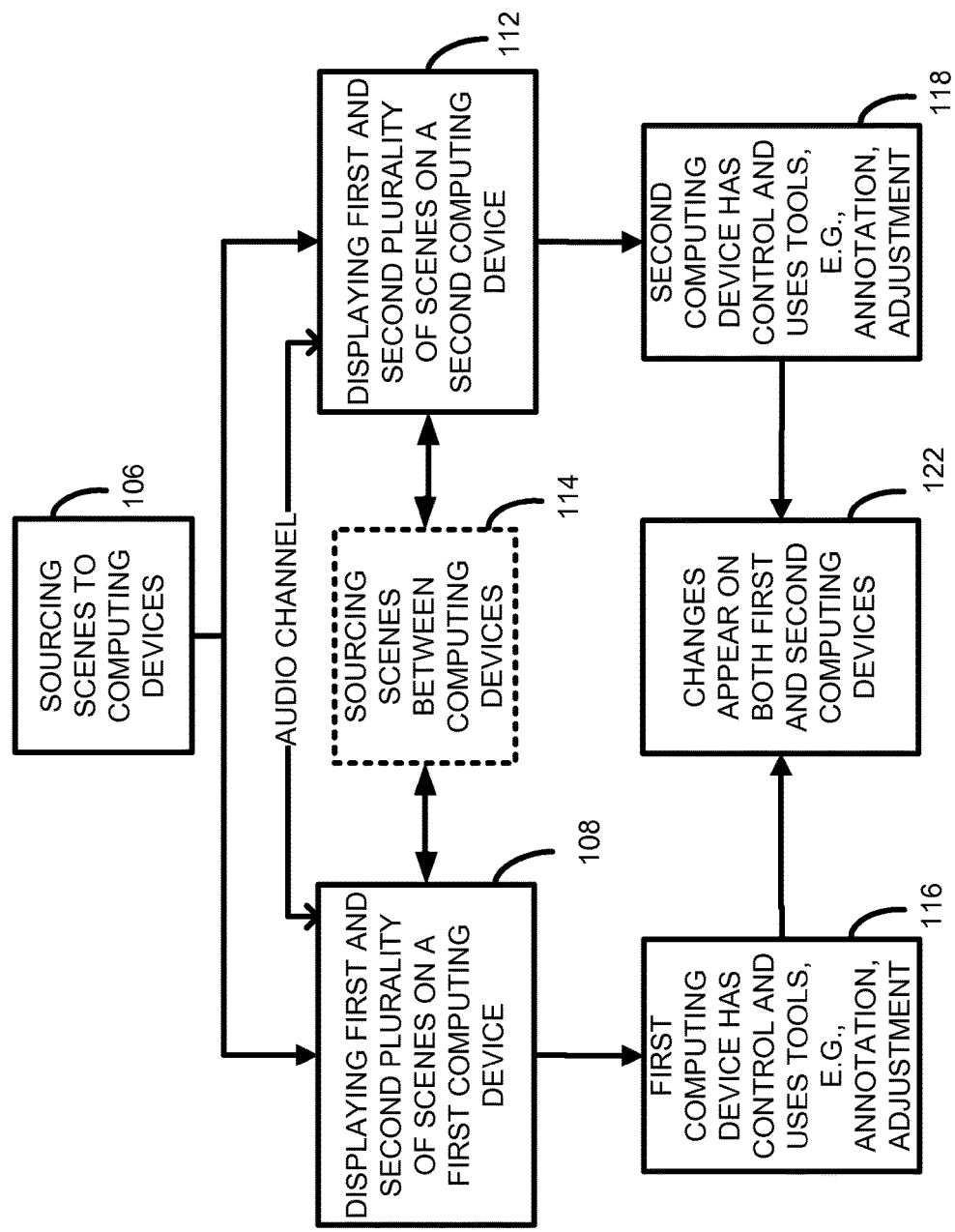
FIG. 10 is a flowchart illustrating a second method according to present principles.

FIG. 10 shows a flowchart 100 corresponding to the use of multiple reviewing devices. In a first step, scenes are sourced to multiple reviewing devices (step 106). For example, a central cloud based server system may source scenes to multiple reviewing platforms, each implemented on a tablet computer. A first reviewing device may then display the first and second plurality of scenes, e.g., the vertical and horizontal assortment of scene thumbnails) on a first computing device (step 108). The same step may be performed on a second computing device (step 112). In some cases, scenes and other content may be sourced between the devices (step 114). An audio channel may also be employed, optionally, to allow real-time conversation between the collaborating teams or workers. Asynchronous communications may also be employed.

One or the other of the computing devices, e.g., reviewing devices, may have control of the session at a given time. When the first computing device has control, such may use the tools to perform review and editing of one or more scenes (step 116), while the other reviewing devices can review scenes but cannot annotate or otherwise edit. Similarly, when the second computing device has control, it may control review and edit of the session (step 118). When a device has control and when its user interface is used to make edits or other changes, changes may appear on both the first and the second computing devices (step 122).

While providing control to one or the other of the reviewing devices (at a time) may lead to a more organized reviewing session, it will be understood that implementations are possible in which more than one reviewing device has control. Moreover, in some implementations, it may be desired that a user simply view the session, without the need to install all the described tools within their particular viewing application.

Figure 11:
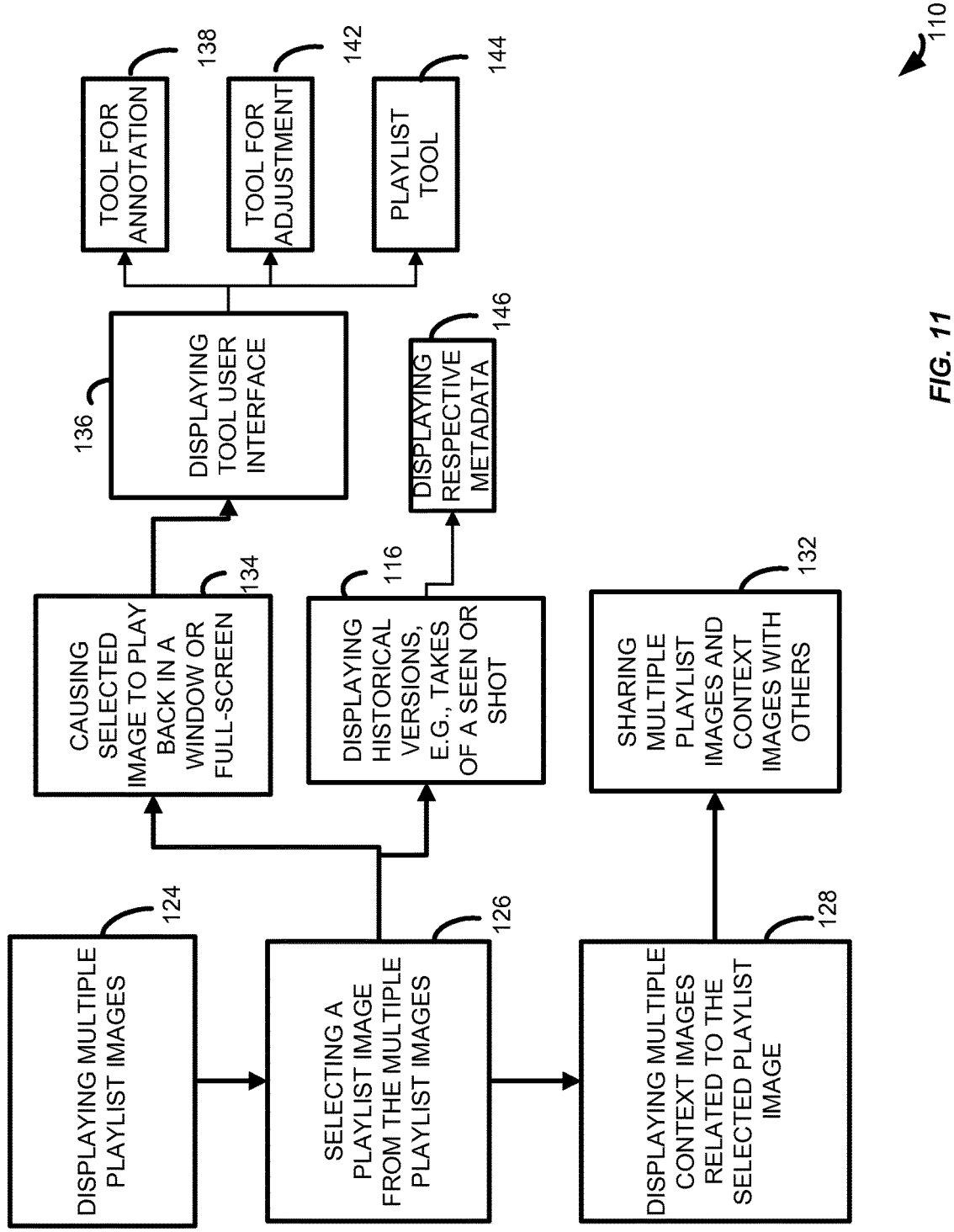
FIG. 11 is a flowchart illustrating a third method according to present principles.

In another implementation, a method is shown by the flowchart 110 of FIG. 11. In a first step, multiple playlist images are displayed (step 124). In a next step, a playlist image is selected from the multiple playlist images (step 126). Multiple contexts images are then displayed related to the selected playlist image (step 128). The multiple playlist images and the context images may then be shared with others (step 132).

Various steps may occur following the selecting a playlist image from the multiple playlist images (step 126). For example, historical versions may be displayed (step 116), along with respective metadata (step 146). In another variation, a selected image may be caused to playback in a window or full screen, full-screen playback being termed a "detail view" (step 134). In either case, a tools user interface may be displayed (step 136), or alternatively tools may be displayed on an existing user interface. The displaying of tools may include displaying an annotation tool (step 138), displaying an adjustment tool (step 142), and displaying a playlist tool (step 144). Other tools will also be understood, given this teaching, and may be available to perform various other functions as may be needed.

Figure 12:
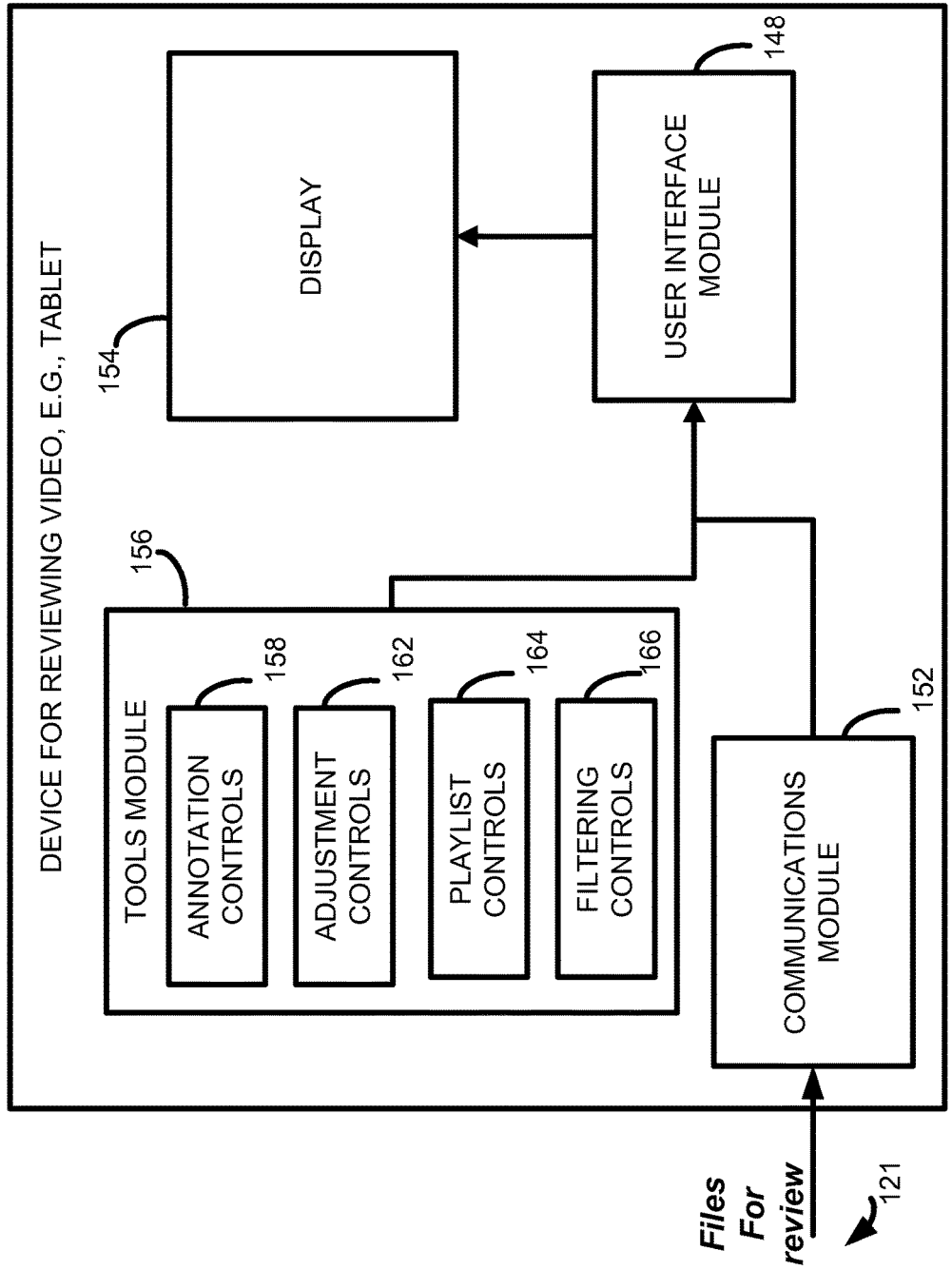
FIG. 12 is a modular depiction of a reviewing device according to present principles.

FIG. 12 displays a reviewing device 120, e.g., a tablet computer or other computing environment, which may be employed to review the scenes as described above. Files for review 121 are sent to the reviewing device 120 and received by a communications module 152. It will be understood that in some cases files may be resident within the computing device 120 itself. The communications module often receives files in a wireless fashion, e.g., using WiFi, but the same may also use Bluetooth or other wireless protocols, as well as wired techniques including network interfaces. Various types of files may be used, so long as the tablet or other computing environment is capable of rendering the same. In some implementations, single JPEG images have been found useful, played back in a particular order, as such allow excellent fidelity even when scenes are being played back frame by frame. A user interface module 148 receives the files from the communications module and renders the scenes as needed on a display 154. Thumbnails may be provided, or the user interface module 148 may determine thumbnails to be displayed, on a UI on the display 154, e.g., a T-bar type UI.

The user interface module 148 communicates with a tools module 156, which itself may provide various tools or which may be provided by submodules within the tools module 156. The tools module may include an annotation controls module 158, for providing annotation functionality as noted above, an adjustment controls module 162, for controlling adjustment of scenes, e.g., exposure in brightness, a playlist controls module 164, and for controlling which scenes are in which playlists, and a filtering controls module 166, for performing filtering functionality according to an entered text or a predetermined filtering criteria. Other modules will also be understood as required to provide the functionality noted above.

What has been described are systems and methods relating to systems and methods for providing review of video content, in a sole or collaborative session. In such systems and methods, a computing environment used for reviewing and editing may operate in a significantly improved fashion, allowing reviews to be conducted and changes to be agreed upon in a highly efficient manner, reducing server load and enhancing production. For example, collaborative reviewing reduces the overall computing load as reviews can be done all-at-once rather than piecemeal, reducing or eliminating the need for multiple independent reviews, particularly where a common set of server-located clips are being reviewed. The T-bar user interface allows convenient display even to a sole user, as multiple requests for reviewing sessions and images/clips are rendered unnecessary, again causing the computing device to operate in a more efficient manner. Finally, it is noted that multiple ways of performing such reviews are still possible, even collaboratively, and thus present principles have not preempted the field.

Additional variations and implementations are also possible. For example, while the examples discussed here focus on video content for movies or television, other implementations can be used in different contexts, such as for videogame content review, medical imaging review, security camera review, and the like. In one such example, a collection of medical images can be presented in a vertical column (as a playlist) to support a diagnosis while related images for a selected image can be displayed in a horizontal row for context, e.g., the images recorded before or after the selected image. Multiple users may then employ this tool to review the medical imaging for diagnosis and care review, e.g., doctors, patients, insurance providers, and the like. In another variation, client devices may be configured to detect a "best quality" file type viewable in a satisfactory manner on a reviewing device, and may request that that type of file be downloaded or streamed.

Accordingly, the implementations and techniques within the scope of the invention are not limited only to the examples described here.

One implementation includes one or more programmable processors and corresponding computer system components to store and execute computer instructions, such as to provide the interface for displaying, selecting, sharing, and editing of video content. One such computing environment is disclosed below.

Figure 13:
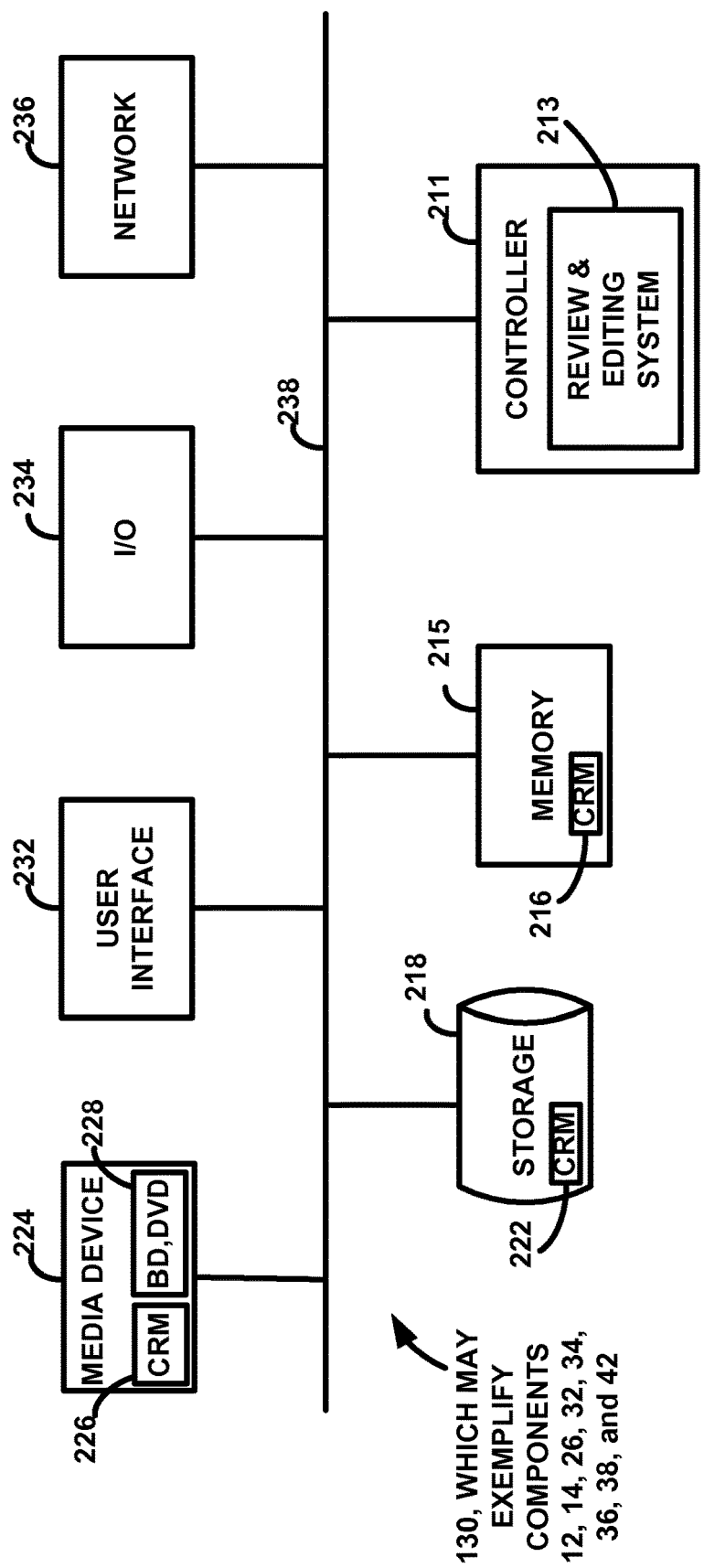
FIG. 13 illustrates an exemplary schematic computing environment which may be employed as certain of the components described.

Referring to FIG. 13, a representation of an exemplary computing environment 130 is illustrated as an example of how one or more systems according to present principles may be implemented. These systems may include, e.g., components indicated herein by reference numerals 12, 14, 26, 32, 34, 36, 38, and 42. Generally, the review and annotation tools, both local and network accessible, as well as the use of real-time communications and sharing, require the use of such connected computing environments to perform the methods of the flowcharts described, e.g., flowcharts of FIGS. 9-12.

The computing environment 130 includes a controller 211, a memory 215, storage 218, a media device 224, a user interface 232, an input/output (I/O) interface 234, and a network interface 236. The components are interconnected by a common bus 238. Alternatively, different connection configurations can be used, such as a star pattern with the controller at the center.

The controller 211 includes a programmable processor and controls the operation of a review and editing/annotation system 213. The controller 211 loads instructions from the memory 215 or an embedded controller memory (not shown) and executes these instructions to control the system.

Memory 215, which may include non-transitory computer-readable memory 216, stores data temporarily for use by the other components of the system. In one implementation, the memory 214 is implemented as DRAM. In other implementations, the memory 214 also includes long-term or permanent memory, such as flash memory and/or ROM.

Storage 218, which may include non-transitory computer-readable memory 222, stores data temporarily or long-term for use by other components of the system, such as for storing data or instructions. In one implementation, the storage 218 is a hard disc drive, a solid state drive, or cloud storage.

The media device 224, which may include non-transitory computer-readable memory 226, receives removable media and reads and/or writes data to the inserted media. In one implementation, the media device 224 is an optical disc drive or disc burner, e.g., a writable Blu-ray® disc drive 228.

The user interface 232 includes components for accepting user input, e.g., the user activation of controls for review and editing. The controller 211 uses inputs entered by the user to adjust the operation of the computing environment.

The I/O interface 234 includes one or more I/O ports to connect to corresponding I/O devices, such as external storage or supplemental devices. In one implementation, the ports of the I/O interface 234 include ports such as: USB ports, PCMCIA ports, serial ports, and/or parallel ports. In another implementation, the I/O interface 234 includes a wireless interface for wireless communication with external devices.

The network interface 236 allows connections with the local network and includes a wired and/or wireless network connection, such as an RJ-45 or Ethernet connection or Wi-Fi interface (802.11). Numerous other types of network connections will be understood to be possible, including WiMax, 3G/4G/LTE, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or WiFi—connected device downloads a copy of the application to their device from a server using a wireless internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the above system where content review is contemplated, the plural inputs may allow plural users to input relevant data and control the review at the same time.

As it is understood that embodiments other than the specific embodiments described above may be devised without departing from the spirit and scope of the appended claims, it is intended that the scope of the subject matter herein will be governed by the following claims.

The invention claimed is:

1. A method for reviewing content, comprising:
  a. receiving data entered by a user about a first plurality of scenes for review;
  b. on a user interface of a first computing device, displaying indicators of the first plurality of scenes for review;
  c. highlighting one of the first plurality, the highlighted indicator corresponding to an indicator of a current scene for review;
  d. by analyzing data corresponding to the first plurality, determining indicators of a second plurality of scenes for review;
  e. displaying the determined indicators of the second plurality of scenes, the second plurality of scenes constituting context scenes associated with the current scene for review; and
  f. upon activation of a scene in the first or second plurality, displaying a third plurality of scenes, the third plurality of scenes corresponding to historical versions of the activated scene, wherein the historical versions of the activated scene correspond to different takes of the scene;
  g. wherein the indicators of the second plurality of scenes are only displayed for the highlighted one of the first plurality, and such that the indicators of the first and second pluralities of scenes constitute intersecting carousel type user interfaces, such that, by swiping actions, an indicator may be placed at an intersection of the intersecting carousel type user interfaces, and such that the highlighting one of the first plurality causes the highlighted indicator to be placed at the intersection.

2. The method of claim 1, wherein the indicators of the first plurality are disposed along a first straight axis.

3. The method of claim 2, wherein the first straight axis is a vertical axis.

4. The method of claim 1, wherein the indicators of the second plurality are disposed along a second straight axis.

5. The method of claim 4, wherein the second straight axis is a horizontal axis.

6. The method of claim 5, wherein an indicator of a first context scene is disposed to a left of an indicator of the current scene, and an indicator of a second context scene is disposed to a right of the indicator of the current scene, and wherein the first context scene is a scene occurring in time directly before the current scene, and the second context scene is a scene occurring in time directly following the current scene.

7. The method of claim 5, further comprising creating an enlarged frame or window at the intersection, and displaying a playback of the current scene in the created enlarged frame or window at the intersection.

8. The method of claim 7, wherein upon activation of the separate frame or window, or the frame or window at the intersection, transmitting a signal to transform the user interface such that the current scene is caused to play back in a full-screen view.

9. The method of claim 8, wherein upon the transforming, further comprising displaying a user interface for a tool to operate on the current scene.

10. The method of claim 9, wherein the tool is a tool for annotation of the current scene, a tool for adjustment of the current scene, a shuttle tool, a filter tool, a playlist tool, or a combination of the above tools.

11. The method of claim 10, wherein the tool for annotation includes an annotation tool selected from the group consisting of: a laser pointer tool or a mark-on tool.

12. The method of claim 10, wherein the tool for adjustment enables adjustment of a scene aspect selected from the group consisting of: exposure, brightness, cropping, color, and combinations of the above.

13. The method of claim 10, wherein the playlist tool for adjustment enables functions selected from the group consisting of: copying, adding, deleting, changing order, building new playlists, and combinations of the above.

14. The method of claim 9, wherein the tool appears on the right or left side of the user interface when the user interface is in a landscape orientation.

15. The method of claim 1, wherein the indicators of the first and second plurality are thumbnails.

16. The method of claim 1, further comprising creating a user interface element of a separate frame or window and displaying a playback of the current scene in the created separate frame or window.

17. The method of claim 1, further comprising displaying a window with metadata for each of the third plurality of scenes.

18. The method of claim 1, wherein the first and second plurality of scenes are sourced from a server.

19. The method of claim 18, further comprising:
a. displaying data representing the first and second plurality of scenes on a user interface of a second computing device;
b. receiving data corresponding to a first annotation associated with the current scene from the first computing device;
c. receiving data corresponding to a second annotation associated with the current scene from the second computing device; and
d. and storing data corresponding to the first and second annotations associated with the current scene on the server.

20. The method of claim 19, wherein the first annotation is received when the first computing device has control of an editing session, and further comprising disallowing receiving a second annotation from the second computing device when the first computing device has the control of the editing session.

21. The method of claim 19, further comprising receiving audio from the first or the second computing device, and sharing the audio with the second or the first computing device, respectively.

22. The method of claim 21, wherein the audio is shared in real-time.

23. The method of claim 1, wherein the first plurality of scenes correspond to different shots within a movie or television episode, and wherein the second plurality of scenes correspond to, for a selected one of the first plurality, scenes occurring before and after the selected one of the first plurality.

24. The method of claim 23, wherein the first plurality of scenes corresponds to different takes of a scene.

25. A method for reviewing content, comprising:
a. receiving data entered by a user about a first plurality of scenes for review, the first plurality of scenes constituting a collection of medical images corresponding to a diagnosis;
b. on a user interface of a first computing device, displaying indicators of the first plurality of scenes for review;
c. highlighting one of the first plurality, the highlighted indicator corresponding to an indicator of a current scene for review;
d. by analyzing data corresponding to the first plurality, determining indicators of a second plurality of scenes for review, the second plurality of scenes constituting context images related to the highlighted one of the first plurality;
e. displaying the determined indicators of the second plurality of scenes; and
f. displaying a filter text field or a filter drop-down menu wherein a user may enter a filter string, the filter string employable to filter the indicators of the first and second pluralities of scenes,
g. wherein the indicators of the second plurality of scenes are only displayed for the highlighted one of the first plurality, and such that the indicators of the first and second pluralities of scenes constitute intersecting carousel type user interfaces, such that, by swiping actions, an indicator may be placed at an intersection of the intersecting carousel type user interfaces, and such that the highlighting one of the first plurality causes the highlighted indicator to be placed at the intersection.

26. A device for editing video, comprising:
a. a user interface module configured to display multiple scenes for review, to receive a selection of a scene from the multiple scenes for review, to highlight the selected scene, and to display multiple context scenes related to the selected scene, the multiple context scenes determined at least in part by analysis of data corresponding to the multiple scenes for review, at least one of the context scenes being a scene that comes before or after the selected scene in a video sequence of scenes; and
b. a tools module configured to provide user modification of the selected scene, and to calculate a response of the selected scene to the user modification,
c. a history module configured to, upon activation of the selected scene, display indications of one or more versions of the selected scene,
d. wherein the response of the selected scene is transmitted to the user interface module for display on the device;
e. wherein the user interface module is further configured to display indicators of the multiple scenes for review as a first plurality of scenes, and wherein the user interface module is further configured to display indicators of the multiple context scenes for review as a second plurality of scenes, and wherein the second plurality of scenes are only displayed for the highlighted scene, and such that the indicators of the first and second pluralities of scenes constitute intersecting carousel type user interfaces, such that, by swiping actions, an indicator may be placed at an intersection of the intersecting carousel type user interfaces, and such that the highlighted indicator is displayed at the intersection.

27. The device of claim 26, further comprising a communications module configured to receive files corresponding to the multiple scenes and the multiple context scenes.

28. The device of claim 27, wherein the communications module is further configured to share data about one or more of the multiple scenes with other devices.

29. The device of claim 28, wherein the shared data corresponds to the multiple scenes and the multiple context scenes as well as annotations, adjustments, or user audio or video comments.

30. The device of claim 29, further comprising a control module, the control module configured to allow only one device at a time to exert control over the reviewing session, wherein the exertion of control constitutes the ability to annotate, adjust, or change a selected image.

31. The device of claim 26, wherein the tools module is configured to annotate or adjust the selected scene.

* * * * *